(12) United States Patent
Moser et al.

(10) Patent No.: US 8,235,772 B2
(45) Date of Patent: Aug. 7, 2012

(54) METHOD AND DEVICE FOR PIN REMOVAL IN A CONFINED SPACE

(75) Inventors: Roland Moser, Zurich (CH);
Christopher John Hulme, Wuerenlingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/604,862

(22) Filed: Oct. 23, 2009

(65) Prior Publication Data

US 2010/0041322 A1    Feb. 18, 2010

Related U.S. Application Data

(63) Continuation of application No. 11/958,569, filed on Dec. 18, 2007, now Pat. No. 7,628,678.

(30) Foreign Application Priority Data

Jan. 8, 2007   (EP) ..................... 07100237

(51) Int. Cl.
*B24C 7/00*   (2006.01)
(52) U.S. Cl. ..................... 451/199; 451/102
(58) Field of Classification Search .......... 451/99, 451/102
See application file for complete search history.

(56) References Cited

U.S. PATENT DOCUMENTS

| | | | | |
|---|---|---|---|---|
| 2,813,710 A * | 11/1957 | Angle | .............. | 451/93 |
| 3,864,876 A * | 2/1975 | Diehn | .............. | 451/92 |
| 4,111,490 A | 9/1978 | Liesveld | | |
| 4,174,571 A * | 11/1979 | Gallant | .............. | 451/91 |
| 4,319,436 A * | 3/1982 | Van Fossen | .............. | 451/87 |
| 4,608,017 A * | 8/1986 | Sadohara | .............. | 433/81 |
| 4,768,709 A * | 9/1988 | Yie | .............. | 451/102 |
| 4,815,241 A * | 3/1989 | Woodson | .............. | 451/102 |
| 4,848,042 A * | 7/1989 | Smith et al. | .............. | 451/78 |
| 5,092,715 A | 3/1992 | Theret et al. | | |
| 5,332,293 A * | 7/1994 | Higgins et al. | .............. | 299/15 |
| 5,795,214 A | 8/1998 | Leon | | |

(Continued)

FOREIGN PATENT DOCUMENTS

DE      296 11 512 U      9/1996

(Continued)

OTHER PUBLICATIONS

European Search Report dated May 15, 2007.

(Continued)

*Primary Examiner* — Maurina Rachuba
(74) *Attorney, Agent, or Firm* — Buchanan Ingersoll & Rooney PC

(57) ABSTRACT

A method for drilling or cutting a pin surrounded by solid material includes the use of a water jet tool having a nozzle that is arranged at an angle with respect to a main body of the water jet tool. The water jet is directed over a portion of the surface of the pin, and removes that portion thereby fragmenting the pin. In order to minimize damage to the surrounding material, the portions removed touches the interface between the pin and the surrounding solid material at a minimal number of points and over a minimal extent of the interface. The method is applicable in particular to the removal of pins used in a press-fit for the securing of blades on a turbine rotor. The method facilitates "in situ" removal of pins within a confined space in a short time and at reduced cost.

11 Claims, 3 Drawing Sheets

U.S. PATENT DOCUMENTS

| | | | |
|---|---|---|---|
| 6,125,729 | A | 10/2000 | Mirabello |
| 6,611,731 | B2 | 8/2003 | Duffin |
| 6,705,921 | B1 * | 3/2004 | Shepherd ............... 451/2 |
| 2003/0004606 | A1 | 1/2003 | Duffin |
| 2004/0173313 | A1 | 9/2004 | Beach |
| 2004/0265488 | A1 | 12/2004 | Hardwicke et al. |
| 2005/0050706 | A1 | 3/2005 | Motzno |
| 2005/0081354 | A1 | 4/2005 | Motzno et al. |
| 2005/0123401 | A1 | 6/2005 | Bunker et al. |
| 2006/0121265 | A1 | 6/2006 | Thompson et al. |
| 2006/0207799 | A1 | 9/2006 | Yu |

FOREIGN PATENT DOCUMENTS

| | | |
|---|---|---|
| EP | 0 955 138 A2 | 11/1999 |
| EP | 1 182 329 | 2/2002 |
| EP | 1 524 059 | 4/2005 |
| GB | 1148072 | 4/1969 |
| GB | 2 349 111 A | 10/2000 |
| JP | 58-200002 | 11/1983 |
| WO | WO 90/02899 A1 | 3/1990 |
| WO | WO 02/32634 | 4/2002 |

OTHER PUBLICATIONS

International Search Report and the Written Opinion of the International Search Authority (Form PCT/ISA/210 and 237) of Application No. PCT/EP2007/063763 dated Apr. 22, 2008.

* cited by examiner

METHOD AND DEVICE FOR PIN REMOVAL IN A CONFINED SPACE

CROSS-REFERENCE TO RELATED APPLICATIONS

This application is a continuation of U.S. application Ser. No. 11/958,569 filed on Dec. 18, 2007, which claims priority to European Application No. 07100237.2 filed on Jan. 8, 2007, the entire contents of which are incorporated herein by reference.

TECHNICAL FIELD

The invention pertains to a method and device for the controlled mechanical removal of pins in a confined access space. It pertains in particular, but not exclusively, to the removal of press-fit pins in steam turbine blading.

BACKGROUND ART

Mechanical removal of pins in a confined space for access is typically performed by means of hand drills or other cutting machinery such as mills. Such removal is in many circumstances difficult, time consuming, and costly.

For the maintenance of machines, such as motors and turbines, the space for access to particular machine parts such as pins with such tools is confined. The maintenance frequently requires difficult manual labor and individual handling of maintenance operations within the given confined space. Alternatively, in order to provide larger space for access, the machine is transported to another facility and disassembled. Either method of maintenance is costly not only due to its labor intensity but also due to the long downtime of the machine being out of operation.

Steam turbine blades are attached to the rotor, among others, by means of a straddle-type blade root and press-fit pins placed in boreholes extending through the blade root and rotor. Prior to their placement in the boreholes, the pins are for example cooled to low temperatures, e.g. by means of liquid nitrogen. Thus slightly reduced in size, they are then pressed into the borehole with heavy-duty tools, which results in a tight, high-tension press-fit between the pin and the turbine rotor and blade root.

During turbine maintenance, the turbine blading must be removed and replaced requiring the removal of the press-fit pins from their boreholes. However, this is a difficult procedure because the space between the blade rows is confined, in some cases as narrow as ten centimeters.

In a first known turbine maintenance method, the space for access is increased by removing and transporting the entire rotor to a manufacturing or maintenance facility and segmenting it into several parts. The pins are then removed using heavy-duty drills or electro discharge machining (EDM) drills. The latter must be used with great care as the heat developed in the EDM drilling can cause a soldering of the pin to the rotor.

In a second known method, the pins are removed "in situ" thus avoiding transporting and segmenting the turbine rotor. Each pin is removed individually using standard, handheld drills with hard metal or diamond drill bits. Particular care must be taken in order to prevent any damage to the material surrounding the borehole so that a high quality press-fit of the pin fastening the new blade to be mounted can be assured. Both methods, rotor segmentation and "in situ" removal, are time-consuming and costly procedures.

GB 2 349 111 discloses a general use of water jets (as opposed to EDM), for drilling of cooling air holes in turbine airfoils. The cooling air holes are drilled prior to mounting the airfoil on the rotor. The application thus has no particular access space requirement.

US 2005/0050706 discloses the use of a water jet for the cutting of a rivet in steelwork. The jet is used to cut a circular ring in the rivet in order to extricate the rivet. The water jet apparatus comprises an extensive assembly of large size and thus unsuitable for drilling in a confined space.

SUMMARY OF INVENTION

It is an object of the invention to provide a method and means to remove pins that are accessible only from a constricted space. Additionally, the material surrounding the pin to be removed is to remain undamaged. Compared to methods of the state of the art, the method shall be performed either on a machine "on-site" or in a classical workshop operation in less time and at less cost. It shall be applicable to the removal of pins in any machine, in particular turbines.

The method according to the invention includes drilling or cutting of a pin surrounded by material using a water jet. The water jet is directed onto the surface of the pin to be removed and directed along a controlled path. The method includes the use of a water jet tool having a supply line for water, a main body, and a nozzle that is arranged at an angle with respect to the longitudinal axis of the main body of the water jet tool and water supply line. The water jet produced by the nozzle is directed over one or more portions of the surface of the pin to be removed removing one or more portions of the pin. Each portion removed includes at least two sections of the boundary between the pin and the surrounding material. The portions removed from the pin divide the pin into two or more fragments thereby releasing the tension in the pin surrounded by the material and effecting a separation of the fragments from the surrounding material. In order to minimise damage to the surrounding material, the one or more portions of material removed from the pin touch the interface or boundary between the pin and the surrounding material at a minimal number of points and over a minimal extent of the boundary. The amount of boundary touched by the removed portions is only large enough to effect a division of the pin into portions.

In an exemplary method, the one or more portions removed from the pin have a cross-section at the surface of the pin extending essentially along the diameter of the pin's surface, dividing it into two parts.

In a further exemplary method, the one or more portions removed from the pin have a cross-section at its surface having a star-like shape, where the points of the star touch the surrounding material. In this case, the pin to be removed is divided into three or more parts, depending on the number of points on the "star-like" shape.

In a further variant of the method, the portion removed from the pin has a polygon shape.

In order to increase the efficiency of the cutting or drilling, an abrasive material is added to the flow of water within the water jet tool, such as for example garnet or "sand-like" substances.

In the case that the material surrounding the pin is ferromagnetic, a further exemplary method includes attaching the water jet tool to the surrounding material using permanent magnets. This allows a time efficient placement of the tool to the surrounding ferromagnetic material and requires no further power or tool. Following the removal of a pin, it is quickly and easily removed and placed at a new location for the removal of a further pin. In order to facilitate the precise placement of the tool with respect to the pin to be removed, the tool is arranged on a displacement table with at least two degrees of freedom of movement. The displacement table is attached to the surrounding metallic material by means of permanent magnets.

Further suitable attachments of the water jet tool, with or without displacement table, are by means of clamps such as mechanical, spring-loaded, pneumatic or hydraulic clamps, belts or any other means of positioning the nozzle. These may be used in the case of non-magnetic surrounding material or permanent magnets cannot be used for another reason, e.g. space reasons.

A water jet used to perform the method according to the invention comprises a nozzle having a longitudinal axis that is angled with respect to the longitudinal axis of the tool main body. The overall length of the water jet tool in line with the water jet directed onto the pin to be removed is thereby reduced in comparison to water jet tools of the state of the art. This facilitates access within a constricted space.

In a further preferred aspect of the invention, a water jet tool assembly for removing the pin includes two or more water jet tool nozzles, each having a water supply line connected to a common single water supply and pump. Each water jet tool is attached, for example, by permanent magnets to the surrounding material such that two or more pins can be removed at the same time.

A further embodiment of the water jet tool according to the invention comprises a supply line for abrasive material connected to the water line within the tool that is connected to the water flow within the tool following the angle between the main and the nozzle. This facilitates a design of the angled portion independent of the abrasive, i.e. that withstands the pressure of the water alone.

The method according to the invention allows an "in-situ" removal of a pin in constricted space facilitated by the angled water jet tool nozzle. Compared to water jet tools of the state of the art, it has a reduced overall length in line with the water jet impinging onto the pin to be removed. This allows its application in much smaller access spaces. Transport and segmentation of the surrounding material or machine is no longer necessary in order to enlarge the access space. The method furthermore allows removal of pins with minimal damage to the surrounding material. Problems associated with EDM are entirely avoided. The material removal method is also performed within a significantly shorter time span compared to the mentioned methods of the state of the art.

The method according to the invention using the angled water jet tool is applicable to the drilling or cutting of pins of any solid material. Such solids include steels, metals, metal alloys, wood, ceramics, fiber reinforced composites, and others. It is particularly applicable in turbine maintenance such as the removal of press-fit pins on steam turbine blading. It is equally applicable to the maintenance of any other machine with confined space for access. Such applications include, for example, turbine maintenance, generator maintenance, drilling operations in boilers or double-hulls of ships.

BEST MODES FOR CARRYING OUT THE INVENTION

Figure 1:
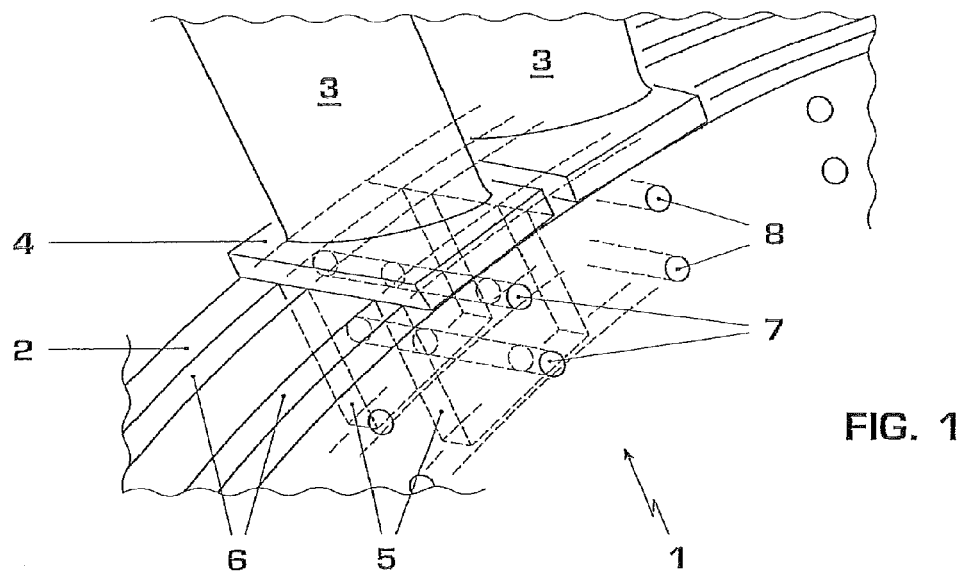
FIG. 1 shows a section of steam turbine blading attached to a turbine rotor by means of straddle-type blade roots and press-fit pins. The method and water jet tool according to the invention is applicable to the maintenance of such turbine blading as well as other machine parts that are difficult to access.

Blades are secured in blade rows to a steam turbine rotor by various means. FIG. 1 shows a portion of a steam turbine rotor 1, on which blade rows are secured by means of a turbine rotor wheel 2. Each blade 3 is equipped with a blade platform 4 and a two-part blade root 5. Each of the radially extending parts of the root 5 is placed in a circumferential groove 6 in the turbine wheel 2. In order to secure each blade root to the turbine wheel 2, one or more pins 7 are placed in bores 8 extending through the turbine wheel 2 and the blade root 5. The pins are placed in the bores by a high-tension press-fit.

Figure 2:
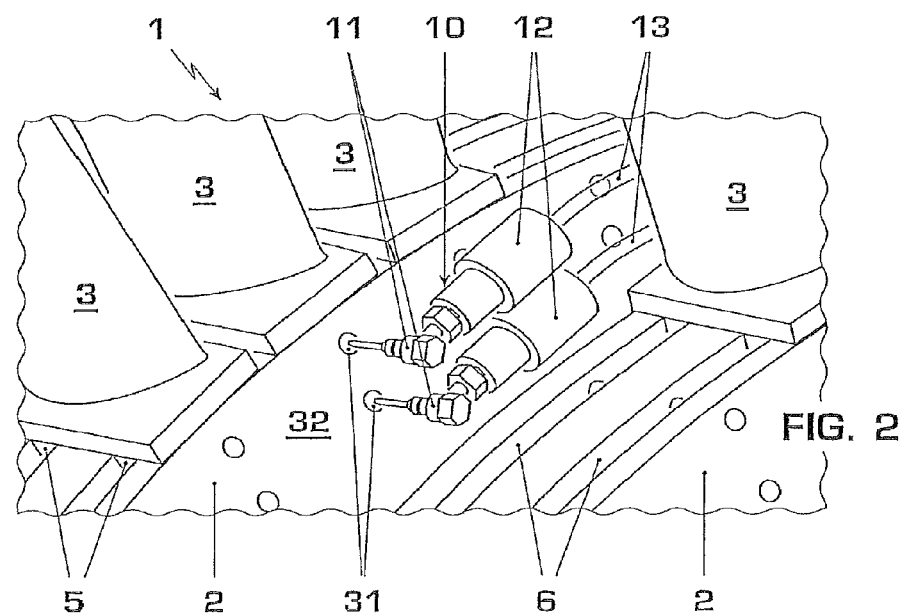
FIG. 2 shows the application of the method according to the invention to the removal of blade pins of a steam turbine. It shows the use of a water jet tool assembly consisting of a set of two water jet tools according to the invention.

When the turbine is due for service maintenance and blading replacement, the blades must be removed. FIG. 2 shows two turbine wheels 2, with blade rows 3 secured to them by their roots 5 in grooves 6. The space between the blade rows is confined so that a conventional tool cannot be directed straight at a pin or does not fit at all. According to the invention, the press-fit pins are removed by means of water jet tools as illustrated in principle in FIG. 2. The water jet tools 10 each include a nozzle 11 arranged at an angle with respect to the longitudinal axis of the main tool body 12 and the water supply lines 13. The arrangement of the nozzle enables the placement of the entire tool within the confined space and allows the removal of pins and blades without segmenting the turbine rotor. Both water supply lines 13 are preferably connected to one single water pump.

Figure 3:
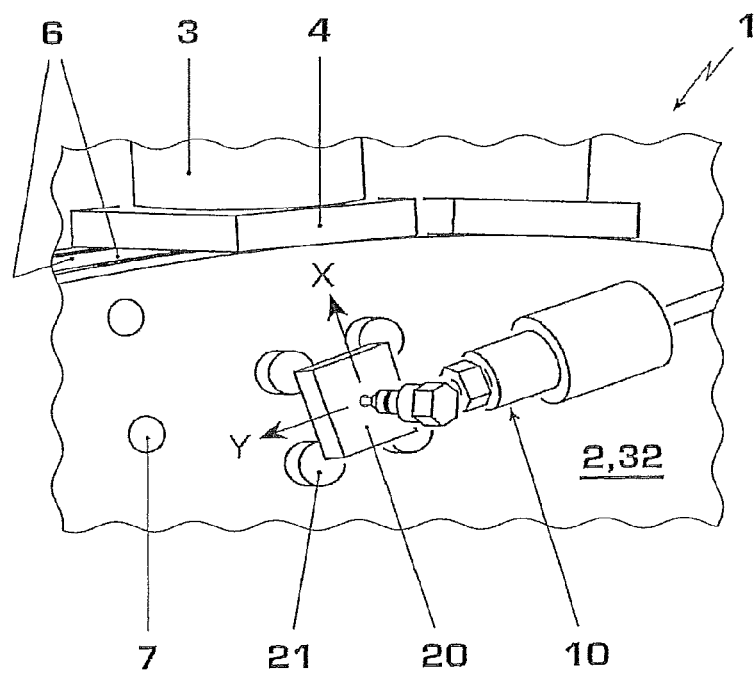
FIG. 3 shows a water jet tool according to the invention arranged on a displacement table and fastened to a turbine rotor by means of permanent magnets.

FIG. 3 shows the arrangement of a water jet tool 10 according to the invention on a displacement table 20 and the fastening of the displacement table to the turbine wheel 2 by means of permanent magnets 21. The use of permanent magnets 21 allows an efficient fastening and removal of the water jet tool from one pin to the next without the need of any further tools or power. The displacement table facilitates the precise placement of the water jet in two directions x and y with respect to the pin to be removed.

As mentioned above, instead of using permanent magnets for the fastening of the water jet tool onto the surrounding material, clamps or belts may be used. All these fastening method are applicable to a water jet tool with or without displacement table. This facilitates fastening in situations when permanent magnets are not applicable because the surrounding material is not suitable or there is not sufficient space for the placement of magnets.

Figure 4:
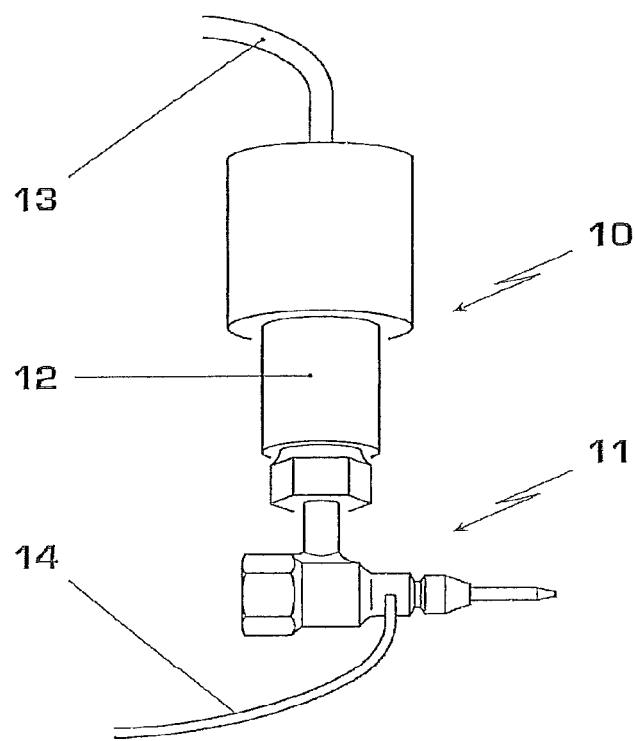
FIG. 4 shows a water jet tool according to the invention with a nozzle angled with respect to the main body of the water jet tool.

FIG. 4 shows, in more detail, a water jet tool 10 used in the method according to the invention and as shown for example in FIGS. 2 and 3. It includes a water supply line 13, a main body 12, and the nozzle 11 arranged at an angle to the main body 12. Preferably it is at a right angle to the body 12 thus minimizing the length of the tool in line with the water jet to be directed onto the pin. However, any other angle is also conceivable, depending on the application and available space.

The nozzle 11 is made of standard high-strength stainless steel. Its internal elements include a standard sapphire nozzle, focalizing tube, and abrasive mixing chamber. A supply line 14 for the addition of abrasives to the water is connected to the water flow within the water jet tool at a point following the angle between the main body and the nozzle 11.

Figure 5:
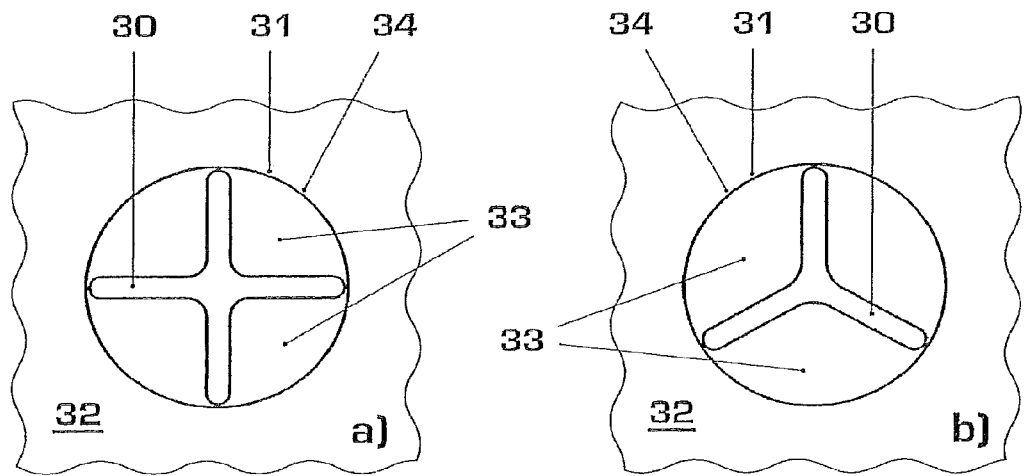
FIGS. 5a, b, and c show examples of one or more portions removed from a pin by the method according to the invention.
Figure 5:
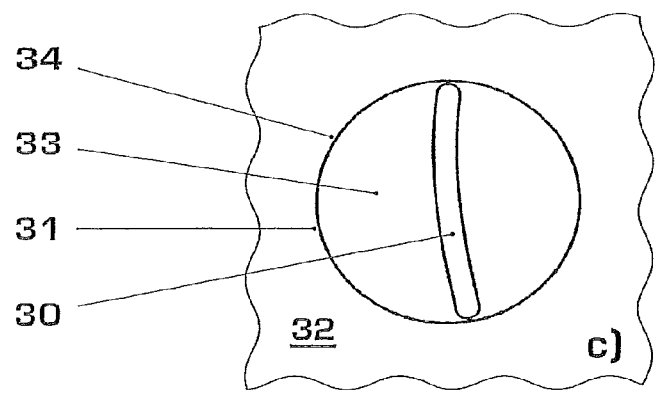

FIG. 5a to c show examples of pin portions 30 removed from a pin 31 surrounded by metallic material 32. The removal of portions 30 releases the tension of the press-fit between the pin 31 and the surrounding solid material 32, here a metallic material, and allows fragments of the pin to detach from the surrounding material.

FIGS. 5a and b show the removal of portions 30 in the shape of a star touching the boundary 34 between the pin 31 and the surrounding material 32 in four and three points, respectively. By this means, the pin is dissected into several fragments 33, whereby the surrounding material is only minimally affected. FIG. 5c shows a strip of material 30 removed from the pin 31 extending across the diameter of the pin. It is the simplest shape of material portion removed effecting fragmentation of the pin 31 into two parts.

Figure 6:
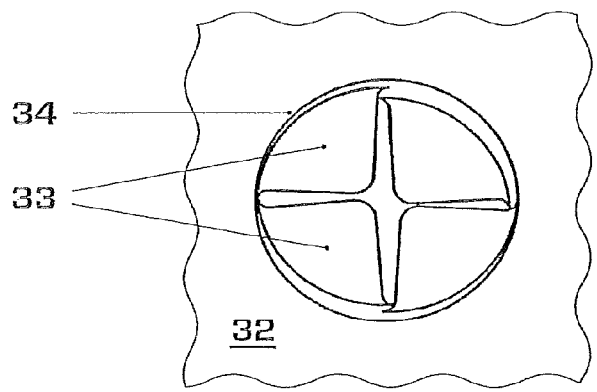
FIG. 6 shows a press-fit pin fragmented as a result of the removal of a star-like portion of the pin. The fragments have detached from the surrounding material as a result of the release of the tension of the press-fit.

FIG. 6 shows the fragmentation and detachment of the fragments 33 from the surrounding material 32.

TERMS USED IN FIGURES 1 turbine rotor
2 turbine wheel
3 blade
4 baled platform
5 blade root
6 groove in turbine wheel
7 blade pin
8 bore for pin
10 water jet tool
11 tool nozzle head
12 main tool body
13 water supply line
14 line for abrasives
20 displacement table
21 permanent magnets
30 material portions removed
31 pin to be removed
32 surrounding solid, metallic material
33 fragment of pin to be removed
34 boundary between pin 31 and surrounding material 32

The invention claimed is:

1. A water jet tool for maintenance of a turbine, comprising:
a water supply line;
a main body having a first longitudinal axis;
a nozzle having a second longitudinal axis that is angled to be between 80°-100° with respect to the first longitudinal axis of the main body of the tool; and
a displacement table with at least two degrees of freedom onto which the water jet tool is mounted and means for directly attaching the displacement table to a surface surrounding an area at which a flow from the nozzle is directed, and wherein the degrees of freedom are in a plane parallel to the surface onto which the water jet tool is mounted.

2. Water jet tool according to claim 1, comprising:
a line for abrasive material connected to the water flow within the water jet tool at a point after the angled portion of the nozzle.

3. Water jet tool assembly comprising two or more water jet tools according to claim 1 each water jet tool having a supply line for water connected to a common single water supply and pump.

4. Water jet tool according to claim 1, wherein the second longitudinal axis is substantially 90° with respect to the first longitudinal axis.

5. Water jet tool according to claim 1, wherein the displacement table is attachable to the material surrounding the area at which the flow from the nozzle is directed, by magnets.

6. Water jet tool according to claim 1, wherein the nozzle passes through the displacement table and is configured to discharge water from the supply line along the second longitudinal axis.

7. A water jet tool for maintenance of a turbine, comprising:
a water supply line;
a main body having a first longitudinal axis;
a nozzle having a second longitudinal axis that is angled to be between 80°-100° with respect to the first longitudinal axis of the main body of the tool; and
a displacement table with at least two degrees of freedom onto which the water let tool is mounted and fastening means for directly attaching the displacement table to a surface surrounding an area at which a flow from the nozzle is directed, the fastening means being fixed to the surface onto which the displacement table is mounted, and wherein two degrees of freedom are in a plane parallel to the surface onto which the water jet tool is mounted and relative to the fastening means.

8. Water jet tool according to claim 7, comprising:
a line for abrasive material connected to the water flow within the water jet tool at a point after the angled portion of the nozzle.

9. Water jet tool assembly comprising two or more water jet tools according to claim 7, each water jet tool having a supply line for water connected to a common single water supply and pump.

10. Water jet tool according to claim 1, wherein the second longitudinal axis is substantially 90° with respect to the first longitudinal axis.

11. Water jet tool according to claim 1, wherein the first and second degrees of freedom are in a single plane parallel to the surface onto which the displacement table is mounted.

* * * * *